United States Patent

[11] 3,619,299

[72] Inventors Paul Weinmann
Aich;
Otto Pauling, Kirchheim, Tech; Franz Macho, Kirchheim, Tech; Hans Wiedenmann, Altbach, Neckar; Adolf Krajc, Wernau-Neckar; Ruth Korner, Plochingen, Neckar, all of Germany
[21] Appl. No. 771,033
[22] Filed Oct. 28, 1968
[45] Patented Nov. 9, 1971
[73] Assignee Junkers & Co. G.m.b.H.
Wernau, Germany
[32] Priority Nov. 4, 1967
[33] Germany
[31] P 15 39 296.8

[54] THERMOCOUPLE
3 Claims, 3 Drawing Figs.
[52] U.S. Cl. ................................................. 136/228
[51] Int. Cl. ................................................. H01v 1/02
[50] Field of Search ........................................ 136/205, 217, 218, 219, 220, 228

[56] References Cited
UNITED STATES PATENTS

| 2,438,575 | 3/1948 | Ray | 136/228 |
|---|---|---|---|
| 2,466,175 | 4/1949 | Kretsch et al. | 136/228 |
| 2,582,481 | 1/1952 | Dvorak et al. | 136/228 X |
| 2,691,056 | 10/1954 | Wolff | 136/228 X |
| 2,836,640 | 5/1958 | Mueller | 136/228 |
| 2,858,350 | 10/1958 | Fritts et al. | 136/228 |
| 2,952,409 | 9/1960 | Matthews | 136/217 X |
| 2,961,474 | 11/1960 | Fritts | 136/217 X |
| 3,022,361 | 2/1962 | Fritts et al. | 136/228 |
| 3,353,260 | 11/1967 | Davis et al. | 136/205 X |

FOREIGN PATENTS

| 1,181,221 | 1/1959 | France | 136/228 |

Primary Examiner—Leland A. Sebastian
Assistant Examiner—Harvey E. Behrend
Attorney—Michael S. Striker ABSTRACT: A thermocouple wherein the tubular outer conductor of the head is connected with the ground by way of a drawn tube a portion of which is expanded radially to snugly receive a portion of the outer conductor. The tube is provided with an external flange or with external threads to facilitate adjustable or nonadjustable fastening of the thermocouple in a support, such as the housing of a safety igniter in a range or oven.

PATENTED NOV 9 1971
3,619,299
FIG.1  FIG.3  FIG.2
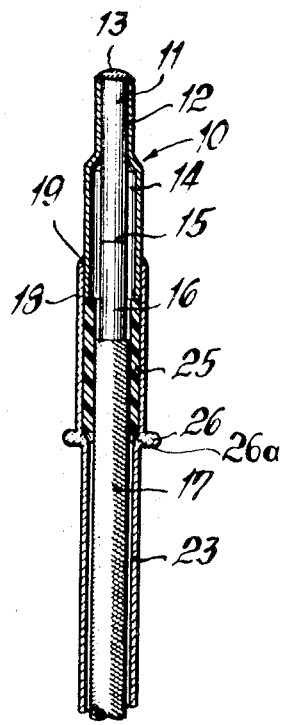
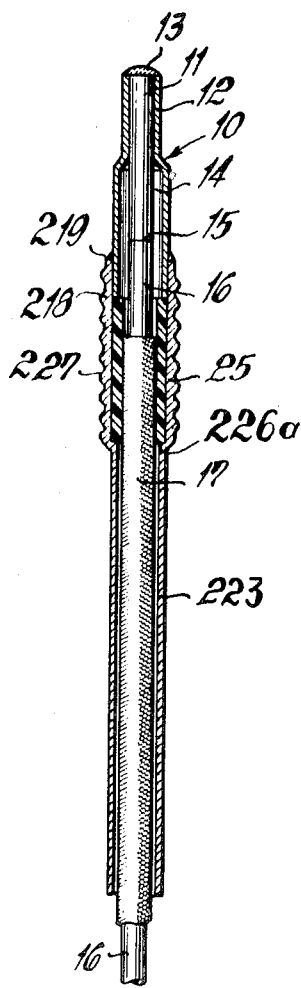
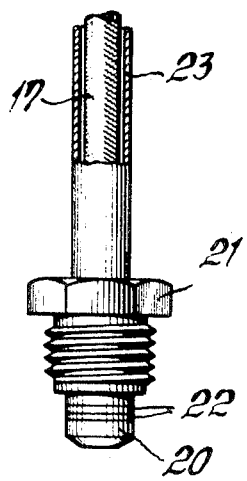
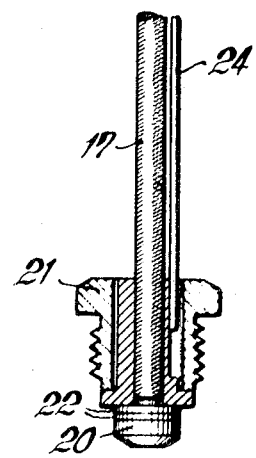
INVENTORS
PAUL WEINMANN
OTTO PAULING
FRANZ MACHU
HANS WIEDENMANN
ADOLF KRAJC
RUTH KÖRNER
By Michael S. Striker
Attorney

THERMOCOUPLE

The present invention relates to thermocouples or thermels, and more particularly to improvements in thermocouples which can be utilized in thermoelectric safety igniters for ovens, ranges or the like.

Presently known thermocouples of the general character to which our invention pertains are normally provided with a sleevelike outer conductor which forms part of a connection between the head of the thermocouple and the ground. The outer conductor is soldered to the head and to the remaining parts of the grounded connection, and each junction must extend circumferentially around the entire outer conductor. Such junctions must be made with utmost care and therefore contribute significantly to the cost of the thermocouple. Moreover, the outer conductor must be produced by resorting to one or more material removing operations.

SUMMARY OF THE INVENTION

It is an object of our invention to provide a simple and reliable connection between the head of a thermocouple and the ground.

Another object of the invention is to provide a grounded connection which can simultaneously perform one or more additional useful functions.

A further object of the invention is to provide a grounded connection at least the major part of which can be produced without resorting to a material removing operation.

An additional object of the invention is to provide a thermocouple which embodies the just outlined grounded connection and which is particularly suited for use in thermoelectric safety igniters for ranges, ovens or the like.

The improved thermocouple includes a head having a preferably pin-shaped or rod-shaped inner conductor, a first tubular outer conductor which spacedly surrounds the inner conductor and a hot junction between the free ends of the two conductors, a second outer conductor which is a tube produced by drawing and includes a radially expanded end portion snugly surrounding a portion of the first outer conductor, and a cold junction electrically connecting the second and first outer conductors.

The second outer conductor can be provided with external threads and/or with an external flange to facilitate adjustable or nonadjustable fastening of the thermocouple in or on a suitable support.

The novel features which are considered as characteristic of the invention are set forth in particular in the appended claims. The improved thermocouple itself, however, both as to its construction and the mode of assembling the same, together with additional features and advantages thereof, will be best understood upon perusal of the following detailed description of certain specific embodiments with reference to the accompanying drawing.

BRIEF DESCRIPTION OF THE DRAWING

FIG. 1 is a partly elevational and partly axial sectional view of a thermocouple which embodies one form of the invention;

FIG. 2 is a similar view of a second thermocouple; and

FIG. 3 is a fragmentary axial sectional view of a third thermocouple.

DESCRIPTION OF THE PREFERRED EMBODIMENTS

The thermocouple of thermel of FIG. 1 comprises an end portion or head 10 which includes a pin-shaped or rod-shaped inner conductor 11 and a grounded sleevelike outer conductor 12. The numeral 13 denotes the electrically conductive junction (hot end) between the conductors 11 and 12. An annular insulating space 14 is provided between the conductors 11, 12 in a region which is slightly spaced from the junction 13. The space 14 surrounds a rigid second (cold) junction or cold end provided between the inner conductor 11 and a second pin-shaped inner conductor 16 which latter is surrounded by a tubular insulator 17. A portion of the outer conductor 12 is snugly surrounded by a portion of a grounded second tubular outer conductor 18 which extends close to the junction 15 and is electrically connected to the conductor 12 by a cold junction 19. The outer conductor 18 also serves as a means for fastening the thermocouple to its support.

The inner conductor 16 extends to a terminal 20 which can be connected, for example, with the contact of a magnetic insert in a thermoelectric safety igniter whose construction forms no part of this invention. The connecting means comprises a threaded adapter 21 which is grounded and is electrically connected with the outer conductor 18; this adapter can be screwed into the housing of the aforementioned safety igniter. A washer 22 of insulating material is installed between the terminal 20 and adapter 21. The connection between the adapter 21 and the outer conductor 18 comprises a further tubular outer conductor 23 which surrounds the inner conductor 16. The main difference between the thermocouples of FIGS. 1 and 2 is that, in FIG. 2, the tubular conductor 23 is replaced by a wirelike conductor 24. If desired, the wirelike conductor 24 can be replaced by a bandlike conductor.

A feature of the present invention resides in a novel design of the outer conductor 18. As stated before, this conductor forms part of a composite outer conductor (including the parts 12, 18, 23 and 21), and it also serves as a means for fastening the thermocouple to its support. In the embodiment of FIG. 1, the conductor 18 is integral with and constitutes an extension of the conductor 23. The internal diameter of the conductor 18 is enlarged so as to correspond to the external diameter of the enlarged portion of the conductor 12, and the latter is telescoped into the thus enlarged conductor 18. Thus, a portion of the conductor 12 is received in and is held by a portion or extension 18 of the conductor 23. It can be said that the junction 19 establishes a direct connection between the conductors 12 and 23. The extension 18 of the conductor 23 is enlarged internally to a flange or bead 26 so that the conductor 23 is formed with an internal shoulder 26a, and a portion of the thus enlarged extension 18 accommodates a sleevelike insulator 25 which abuts against the shoulder 26a. The internal diameter of the insulator 25 corresponds to or approximates the external diameter of the insulator 17. The external diameter of the insulator 25 corresponds to or approximates the external diameter of the open lower end portion of the outer conductor 12.

In FIG. 2, the outer conductor 118 is electrically connected with the adapter 21 by the aforementioned wirelike conductor 24. This conductor 118 if formed by radial expansion of a drawn tube whose internal diameter is initially less than the external diameter of the open end portion of the conductor 12. The conductor 118 is expanded radially to such an extent that it can be slipped or forced onto the conductor 12, and the thus expanded portion of the conductor 118 accommodates the tubular insulator 25. The conductor 118 is thereupon electrically connected with the conductor 12 by a cold junction 119. The lower end portion of the conductor 118 (below the flange or bead 126, as viewed in FIG. 2) is soldered to the adjoining end of the wirelike conductor 24, and the other end of the conductor 24 is electrically connected with the adapter 21. The flange 26 or 126 serves as a stop when the thermocouple of FIG. 1 or FIG. 2 is fastened in its support. The flange 26 or 126 is preferably formed by upsetting and is provided at the level of the internal shoulder 26a or 126a.

In FIG. 3, the thermocouple comprises a tubular outer conductor 223 whose extension 218 is expanded internally to provide a shoulder 226a for the insulator 25 and to accommodate the larger-diameter end of the conductor 12. The cold junction between the extension 218 and the outer conductor 12 of the head 10 is shown at 219. The flange or bead 26 or 126 is replaced by a rolled thread 227 which facilitates proper but adjustable fastening of the thermocouple in a support so that the head 10 is held in an optimum position with reference to a pilot flame, not shown.

It is further clear that the flange 26 or 126 or the thread 227 can be replaced by other fastening means for properly positioning the extension 18, 118 or 218 in a support.

An important advantage of the improved thermocouple is that the outer conductor or extension 18, 118 or 218 can be produced by drawing and by subsequent radial expansion to take the larger diameter end of the head 10. Thus, the extension can be produced without resorting to a material removing operation. Furthermore, a single junction (19, 119 or 219) suffices to establish a satisfactory electrical connection between the extension 18, 118 or 218 and the head 10.

"The thermocouple of our invention can be utilized in apparatus of the type disclosed for example, in U.S. Pat. No. 3,258,659 or 3,252,500."

Without further analysis, the foregoing will so fully reveal the gist of the present invention that others can, by applying current knowledge, readily adapt it for various applications, without omitting features which fairly constitute essential characteristics of the generic and specific aspects of our contribution to the art.

What is claimed as new and desired to be protected by Letters Patent is set forth in the appended

We claim:

1. In a thermocouple, a combination comprising a head including a first inner conductor and a first outer conductor spacedly surrounding said first inner conductor, said conductors having each a free end at one end of said head, and said head further including a hot junction establishing an electrical connection between said free ends, said first outer conductor having opposite said free and a portion of larger diameter; a second outer conductor constituted by a drawn tube having an inner diameter smaller than the outer diameter of said portion of said first outer conductor and a radially enlarged end portion of an inner diameter greater than the outer diameter of said portion of said first outer conductor, snugly surrounding said portion of said first outer conductor and permanently secured thereto; a second inner conductor joined at one end to the other end of said first inner conductor within said portion of said first outer conductor; a terminal contact connected to the other end of said second inner conductor; and a threaded adapter mounted on said second outer conductor adjacent said terminal contact and electrically connected to said second outer conductor for fastening the thermocouple to a support, said second inner conductor extending between said head and said terminal contact through said second outer conductor and said second outer conductor extending the complete length of said second inner conductor and constituting a continuous uninterrupted protecting tube between said head and said terminal contact, said second inner conductor and said terminal contact being insulated from said second outer conductor and said adapter.

2. A combination as defined in claim 1, wherein said second outer conductor is grounded.

3. A combination as defined in claim 1, wherein said second outer conductor includes an external flange.

* * * * *